Figure 1:
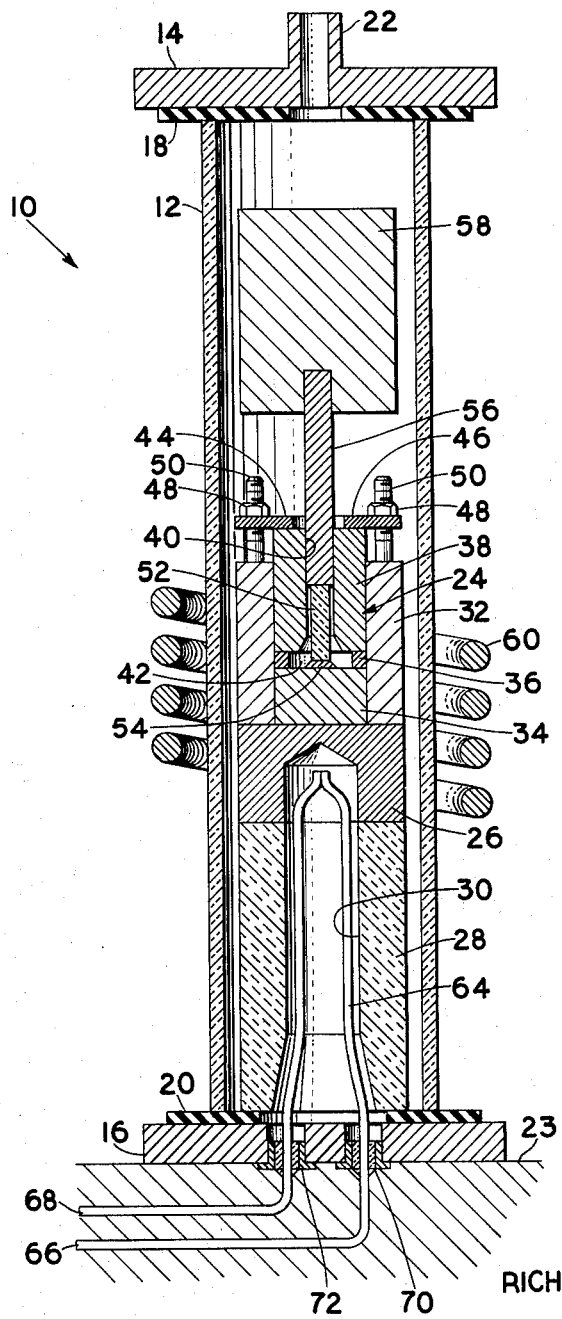

RICHARD C. REMINGTON
INVENTOR.

3,214,254
PRECISION GLASS MOLDING PROCESS AND APPARATUS
Richard C. Remington, Pompton Plains, N.J., assignor to General Precision Inc., Little Falls, N.J., a corporation of Delaware
Filed Dec. 28, 1961, Ser. No. 162,743
8 Claims. (Cl. 65—32)

The present invention relates to a process and apparatus for molding glass articles, and more particularly to a process and apparatus for molding combination glass and metal parts in a manner to eliminate the need for intricate grinding of the finished part.

Previously, molded glass parts or combination molded glass and metal parts for electronic equipment were made in molds of graphitized carbon. These carbon molds deteriorate rapidly at molding temperatures and have to be replaced after two or three parts have been made. Parts molded in carbon molds are also inferior in quality due to the porosity of the carbon. The molding process and apparatus of the present invention overcomes these disadvantages by using a metal mold having a proper coefficient of expansion to provide automatic separation of the glass from the walls of the mold as the unit cools. The metal walls of the mold cavity may also be coated with a water carbon suspension to prevent the glass from sticking to the walls.

In one embodiment of the invention, the mold is assembled and clamped within an evacuated chamber and the glass to be molded is inserted in the mold cavity and pressurized by a weighted plunger. Heat is then applied to the glass from an external heating source until it reaches its melting point and flows under the pressure applied by the weighted plunger to fill the cavity. The mold is allowed to cool in the vacuum which automatically separates the glass from the walls of the mold due to the different coefficients of expansion of the metal and the glass. The parts of the mold are then disassembled to remove the finished molded article.

Accordingly, it is one object of the invention to provide a process and apparatus for molding glass articles with a smooth finished surface that does not require grinding.

It is another object of the invention to provide polished molds made of metal for molding glass articles as finished pieces which do not require grinding.

It is a further object of the invention to provide polished molds made of metal for molding glass articles so as to improve the life of the molds.

It is a still further object of the invention to provide a process and apparatus for molding glass articles automatically within a sealed vessel.

It is a still further object of the invention to provide a process and apparatus for molding glass articles or combination glass and metal articles which is simple, effective, longer-lived and produces an improved product.

Other objects and features of novelty of the present invention will be specifically pointed out or will otherwise become apparent when referring, for a better understanding of the invention, to the following description taken in conjunction with the accompanying drawing, wherein:

FIG. 1 is a sectional view in elevation of a molding apparatus embodying features of the invention.

Referring to the drawing, a molding apparatus 10 embodying features of the invention is illustrated. It is comprised of a tubular body 12 preferably made of vycor or quartz having plates 14 and 16 covering the ends thereof with rubber gaskets 18 and 20 interposed therebetween to provide a good seal. The upper plate 14 is preferably made of aluminum to reduce the weight on the tubular body 12 and has a fitting 22 adapted to be connected to a vacuum pump (not shown) to enable the body 12 to be evacuated. The lower plate 16 rests on a supporting surface 23.

A mold 24 is supported within the body 12 on a metal mold support 26 which in turn is supported on a support block 28 made of a suitable heat insulating material such as lava and having a central aperture 30 extending therethrough. The mold support 26 has a tubular metal support 32 fixed thereto and surrounding the mold 24. Both the supporting block 26 and tubular support 32 act as a heat sink when heat is applied to the glass within the mold cavity, as will be described.

The mold 24 comprises a metal bottom part 34, a metal ring 36 and a tubular metal upper part 38 having a bore 40 extending therethrough with the lower end thereof flared outwardly to cooperate with the bottom part 34 and ring 36 to define a mold cavity 42. The three parts of the mold are tightly clamped together by clamps 44 and 46 which are clamped down on the upper end of the upper part 38 by nuts 48 on threaded studs 50 projecting upwardly from and secured to the upper end of the tubular support 32.

The glass to be molded is inserted in the cavity 42 in any suitable form, such as a rod, a tube or a powdered material. As illustrated in the drawing, the glass is in the form of a glass rod 52 having the lower end thereof resting directly on a metal piece 54 supported on the bottom part 34 of the mold and to be embedded in the finished glass article. A plunger 56 is slidably supported in the bore 40 with the lower end thereof resting directly on the upper end of the glass rod 52 to exert a force thereon determined by a weight 58 on the upper end of the plunger 56. When the temperature of the glass rod is raised above its melting point in a suitable manner, such as by an induction heating coil 60 surrounding the tubular body 12, the glass will flow under the pressure provided by the weighted plunger 56 and fill the entire cavity 42. All of the metal surfaces of the cavity, including the bottom end of the plunger 56, are preferably highly polished and coated with a material such as aqua-dag, a water-carbon suspension, to prevent the glass from sticking to the walls of the cavity.

After the glass rod 52 has melted and completely filled the cavity 42, the heating is terminated and the entire apparatus allowed to cool while maintaining the vacuum. By making the mold parts 34–38 of metal having a proper coefficient of expansion lower than the coefficient of expansion of the glass 52, the glass will automatically separate itself from the walls of the mold cavity as the apparatus cools. When the apparatus has completely cooled, the vacuum can be broken and the mold disassembled to enable the final glass product to be removed with the metal piece 54 firmly embedded in the bottom thereof. This finished product will have a very smooth surface which does not require any final intricate grinding operations to be performed thereon. In addition the mold 24 can be used over and over again since it is made of metal and has a long life as compared to the prior art carbon molds.

A conventional thermocouple 64 may be positioned in the central bore 30 in the support block 28 in position to measure the temperature of the mold 24 and the heat sink thereabout. The ends 66 and 68 of the thermocouple extend through glass headers 70 and 72 which provide seals thereabout to maintain the vacuum in the tubular body 12, and may be connected to a thermocouple bridge (not shown) to record the temperature.

While it will be apparent that the embodiment of the invention described above is well calculated to fulfill the objects of the invention, it will be appreciated that many changes, revisions and modifications may be made without departing from the spirit and scope of the invention as defined in the following claims. For example, although in the preferred embodiment of the invention the tubular body 12 is evacuated, it is primarily necessary that the molding operation take place in an inactive environment, and this can also be provided by filling the chamber with suitable inert gases such as helium or argon, for example.

What is claimed is:

1. The method of molding a glass article, which includes the steps of, selecting a mold of metal parts having a coefficient of expansion less than glass and having a closed cavity therein, positioning glass in said cavity, slidably mounting a weighted plunger on said mold with one end thereof having a peripheral face sealingly engaging the adjacent mold portion and having an end face engaging said glass to exert a continuous pressure thereon, enclosing said mold in a sealed chamber having an inactive environment, and applying heat to said glass until it flows under the pressure applied by said plunger and fills the mold cavity.

2. Apparatus for molding a glass article, which includes the combination of, a sealed chamber having an inactive environment, a mold of metal parts having an enclosed interior cavity therein supported within said chamber, a plunger having an end portion with an end face slidably mounted in a bore in a part of said mold with said end portion sealingly engaging the bore surfaces to seal the cavity and with said end face facing said cavity in position to exert a continuous pressure on glass when disposed within the cavity, and heating means for heating glass within said cavity.

3. The invention as defined in claim 2 wherein said heating means is positioned outside of said sealed chamber and heats the glass by induction, and including heat sink means surrounding said metal mold.

4. The invention as defined in claim 3 wherein said mold comprises a plurality of metal parts tightly clamped together within said heat sink means.

5. The invention as defined in claim 3 wherein said heating means comprises an induction heating coil surrounding the outside of said sealed chamber.

6. Apparatus for molding a glass article, which includes the combination of, a mold made of metal parts having an interior cavity for positioning glass in a plastic state when disposed within said cavity, means for reducing the volume of said cavity for compressing said glass in its plastic state, means for evacuating and for providing a near-vacuum pressure in said cavity, and means for applying heat to said glass whereby the glass will become plastic when its temperature is raised above its melting point and will entirely fill said evacuated cavity under the action of said continuous pressure thereon.

7. The invention as defined in claim 6 including a coating of material on the walls of said cavity to prevent oxidation of the metal parts of said mold.

8. The method of molding a glass article, which includes the steps of, assembling a closed expansible mold of metal parts around a glass, the mold metal having a lower coefficient of expansion than the glass, exerting a continuous pressure on the mold tending to compress the volume of said mold and said glass therein, enclosing said mold in a sealed chamber having an inactive environment, heating said glass in the presence of said continuous pressure until it flows and fills the mold, and cooling said mold and glass at substantially the same rate of temperature change to automatically separate the glass from the walls of the mold.

References Cited by the Examiner

UNITED STATES PATENTS

| 674,378 | 5/01 | Good | 65—322 |
|---------|------|------|--------|
| 2,386,820 | 10/45 | Spencer | 65—32 |

FOREIGN PATENTS 200,405  12/55  Australia.

DONALL H. SYLVESTER, *Primary Examiner.*